Figures 1, 2:
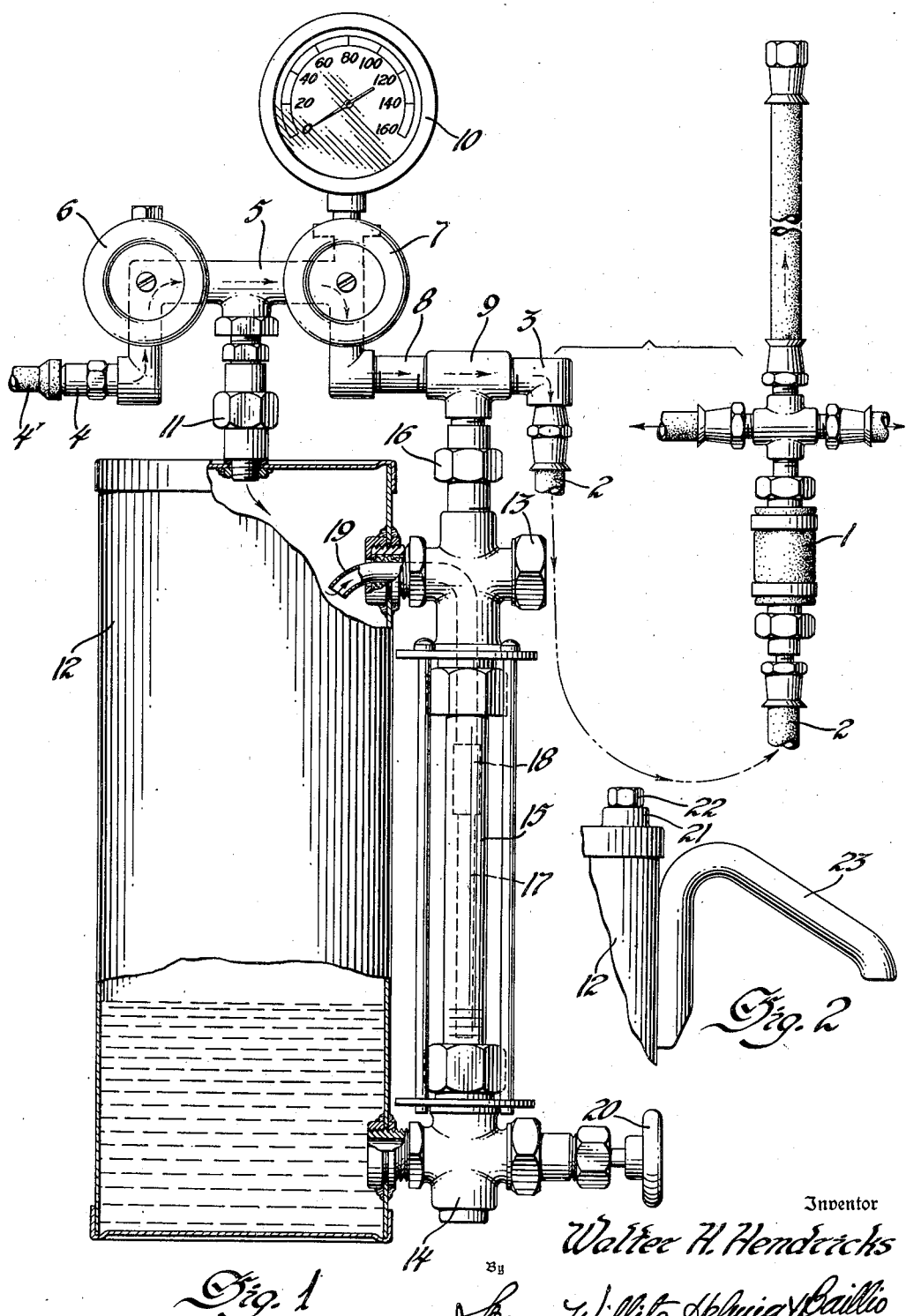

Patented Jan. 10, 1950

2,493,967

UNITED STATES PATENT OFFICE 2,493,967

LEAK TESTING UNIT

Walter H. Hendricks, Berkley, Mich., assignor to General Motors Corporation, Detroit, Mich., a corporation of Delaware Application November 18, 1946, Serial No. 710,700

8 Claims. (Cl. 73—40)

Hydraulic operating systems are currently employed on automobile bodies whereby at the press of a selector button near the operator's seat there will be power-performed a desired given operation, such as the raising or lowering of any window, the adjustment of seat position, and in the case of a convertible type body the raising or lowering of a folding top. As in any liquid pressure operating system there is the occasional difficulty of troublesome leakage to be eliminated and this should be done immediately upon installation of the operating mechanism, including the piping, while it is still accessible for easy correction. Otherwise the steady flow of production lines will be seriously disrupted and the upholstery and trim will be damaged and there will be required the disassembly of the system concealing parts at great loss of time and interference to plant efficiency. Minute leaks heretofore have often been overlooked or ignored but since they can prove to be more annoying than large leaks and may later develop into large leaks it is essential that they be immediately noted and promptly remedied.

Accordingly it is here proposed to provide a leakage testing device which is compact and portable and both simple to build and easy to operate and which utilizes already available factory air pressure supply for coupling to the assembled operating system prior to its being charged with hydraulic liquid and by means of cooperating air flow passages in the coupling under manual control of selective operated shut-off valves gives quickly a visual indication of the leakproofness of the system and whether any leakage to be corrected is of large or small magnitude.

A preferred embodiment of a portable test unit is illustrated in elevation with parts broken away in Figure 1 of the accompanying drawing and further details are shown in Figure 2 in elevation.

In addition to its usefulness in testing assembled hydraulic systems the device obviously is adapted for testing any of a wide variety of enclosed spaces and may be considered generally as a conduit having two branches, both connected with an outlet leading to the space to be tested and with an inlet leading from a suitable source of pressure fluid, such as the usual plant compressed air lines with a main shutoff valve in the inlet; a pressure gauge to indicate pressure in the charged system and rapid loss of pressure in the event of large leakage from the charged system after the main valve has been shut off; a second shutoff valve in one branch which after the system has been charged may be shut off to divert any additional fluid flow through the other branch to make up small pressure loss and a sight tube in the second branch containing a liquid through which make-up air must bubble for a visual indication of slow leakage from the space being tested. In addition, and of special significance, is the incorporation in the second branch and in cooperative association with the sight gauge of a liquid replenishment reservoir having at its bottom a valved connection with the bottom of the tube to enable reestablishment of the gauge liquid level in the event of accidental or careless manipulation of the controls in a manner to displace indicator liquid. By preference the liquid employed should be of the same type as is eventually to be used in the system being tested for the obvious reason that its displacement into the system piping will be harmless.

Referring more particularly to the drawing, the reference numeral 1 indicates a quick detachable coupling for joining the piping of the system or the space whose fluid tightness is to be determined. It is on the end of a convenient length of flexible hose 2 leading from an outlet fitting 3 of the pressure fluid conduit, which latter in addition to the sight tube and tank consists of conventional pipe fittings, couplings and valve bodies between the outlet 3 and the inlet 4, which inlet is joined by a flexible hose 4' with the source or supply of compressed air. Coupled to the inlet 4 is one end of a valve body 5 containing a pair of manually controlled cutoff valves arranged in tandem and provided with operating handles 6 and 7. At its opposite end the valve body 5 is joined by a short length of pipe 8 to a T-fitting 9 joined to the outlet 3 and thus is formed one branch or path for air flow through the unit. An air pressure indicator gauge 10 is joined to the conduit beyond the first of the tandem valves by being threaded into a tapped hollow boss on the valve body 5 near the second valve 7.

To by-pass the conduit branch containing the second shutoff valve 7 the valve body 5 between its two valves is joined by a coupling 11 to the upper air space within the liquid supply tank 12 which carries at its side a pair of spaced fittings 13 and 14 locating between them the sight tube 15 of glass or other transparent material, whose upper end communicates through the top fitting 13 and a coupling 16 with the T-fitting 9 at the outlet. Opening into the bottom of the sight gauge below the normal liquid level therein is the lower end of a tube 17 housed within and of smaller diameter than the sight tube 15 and preferably a transparent portion joined at its upper end by a flexible rubber sleeve 18 to a metal elbow 19, whose lateral leg projects through a packing seal in the top fitting 13 and leads from the upper air space of the liquid replenishment tank 12. The lower fitting 14 contains a valve under manual control of the handle 20 for communicating the bottom of the tank 12 with the bottom of the sight tube 15.

Replenishment of fluid accidentally carried away from the sight gauge 15 by a high rate of air flow may be effected whether or not the system is under pressure by operating the handle 20 to open the lower valve and allow fluid stored in the reservoir to reach its level in the sight gauge. At all other times this valve is kept closed. Initial volume and subsequent refilling of liquid in the unit should be at least enough to afford a level in the sight gauge a short distance above the open bottom of the enclosed tube 17 and can be greater if desired, the level in the sight gauge being controlled by valve 20. A filler boss 21 in the top of the tank is closed by a screw plug 22, as seen in Figure 2, which also shows a hanger strap or handle 23 welded to the tank side wall and by which the unit may be suspended in upright vertical position on some portion of each vehicle body whose incorporated system is undergoing test.

In the use of the device, after being properly coupled to the supply line and to the source to be tested and then charged with compressed air with both valves 6 and 7 set to open position, the operator will first close the main control valve 6 and note the reading on the gauge 10. Fast leaks are indicated by a decreasing pressure gauge reading and should be remedied and the test repeated. Any available line pressure can be employed since it is only necessary to note whether a pressure drop occurs. In the event the gauge reading remains constant then the upper right-hand valve 7 is closed whereupon any slight unbalance or differential in pressure on opposite sides of the liquid level gauge resulting from slow leaks will immediately be indicated by a bubble or bubbles rising slowly from the end of the small glass tube 17. After locating and fixing such leaks, if any, the system, if it is an operating mechanism having moving parts, will be brought into action for a further test observation of possible leakage.

It is to be noted that the left-hand valve 6 serves as the main control valve for air flow through the unit. Except when testing for small leaks the upper right-hand valve 7 should be open at all times. Air flow through the branch containing the valve 7 will be direct and therefore by-pass the sight gauge since the pressures on opposite sides thereof are equalized. It is because of this equalization of pressures that the liquid supply may be replenished through the lower valved fitting 14 regardless of whether the system is fully charged or is entirely disconnected from the pressure supply line.

I claim:

1. In a pressure fluid operating test device for indicating leakage from a closed space, a fluid pressure conduit for connecting said space with a source of pressure fluid, a first control valve operable to shut off the source of pressure fluid, a fluid pressure indicating gauge connected with the conduit beyond said valve and serviceable to indicate high leakage, and means to supplement said gauge by indicating low leakage including a second valve operable to close the conduit beyond the first valve and a by-pass around the second valve, said by-pass including a tank in communication at its upper portion with the conduit between said valves and containing a liquid in its lower portion, a transparent tube communicating at its upper end with the conduit beyond the second valve and containing a supply of liquid in its lower end, a valved connection between the bottom of said tank and the bottom of said tube, and pressure fluid conducting means leading from the top of said tank and ending in open communication with the tube at a point below the level of liquid therein.

2. In a leakage test device of the character described, a conduit for connecting a pressure fluid source with a space to be tested, a pair of selectively operable valves arranged in tandem in said conduit, a by-pass connecting the conduit between said valves with said space, means in the by-pass operable in response to pressure differential on opposite sides thereof to indicate fluid flow therethrough and a pressure gauge operatively connected with the conduit to show the pressure of fluid in said space.

3. In a test device of the character described, a conduit for joining a source of pressure fluid with a space to be tested, a pair of shutoff valves arranged in the conduit for selective operation, a pressure reading gauge in the conduit to indicate pressure in said space, a sight gauge containing liquid in its bottom and having its upper air space joined to said conduit beyond both valves and means providing a passage leading from the conduit between said valves to the sight gauge at a point below its liquid level.

4. In a test device of the character described, a sight gauge and a liquid supply tank therefor, a valved connection between the bottoms of the gauge and tank, an outlet from the top of the gauge to a space to be tested, a pressure indicating gauge for the outlet, a valved connection controlling pressure fluid flow to the top of the tank, means providing a passage between the top of the tank and the bottom of the sight gauge below its liquid level, and a valved connection between the top of the tank and the top of the sight gauge.

5. In a leakage test device of the character described, a conduit for connecting a pressure fluid source with a space to be tested, a pair of selectively operable valves arranged in series in said conduit to control communication of the pressure fluid source with said space, a fluid pressure indicator in the conduit operable upon selective valve setting wherein the conduit is cut off from the pressure fluid source, to test for relatively rapid pressure drop in said space, a branch passage communicating said space with said conduit at a point between said pair of valves as a by-pass around the second of said valves, and a fluid flow indicator in said branch passage operable upon said selective valve setting in which the fluid source communicates with said space solely through the branch passage, to test for relatively minute pressure drop in said space while the space is charged with pressure fluid.

6. In an air pressure operating test device of the character described, means to communicate a source of air under pressure with a space to be tested, including a storage tank having a replenishment liquid supply in its bottom and an air space at the top arranged for connection with the pressure air source, an air flow delivery pipe leading from the air space at the top of the tank to the outside of the tank and to a point near the bottom thereof, a sight tube enclosing the air delivery outlet at the bottom of said pipe having a liquid supply in its bottom above the air outlet at the bottom of said pipe and an air space at the top arranged for connection with the space to be tested, and a normally closed valved connection joining the bottom of the tank and with the bottom of the tube to enable replenishment liquid flow from the tank to the tube under control of said valve.

7. In an air pressure operating test device of the character described, means to communicate a source of air under pressure with a space to be tested, including a tank having a liquid supply in its bottom and an air space at the top arranged for connection with the pressure air source, a sight tube also having a liquid supply in its bottom and an air space at the top arranged for connection with the space to be tested, a valved connection between the tank and the tube below their liquid levels and an air connection leading from the air space at the top of the tank to the bottom portion of the tube below the liquid level therein, said means further including a by-pass around the tank and tube and a manually operable valve to open or close said by-pass, a pressure indicating gauge operable to give a reading of air pressure in said space and manual valve means controlling air pressure flow from said source through both the tank and said by-pass.

8. In a test device of the character described, an inlet for connection with a fluid pressure source having a shutoff valve therein, an outlet for connection with a space to be tested, communicating with a pressure gauge to indicate pressure within said space, means providing two paths of fluid flow from the inlet to the outlet, one of said paths comprising a connecting conduit having a shutoff valve therein and the other path comprising a sight gauge having a liquid supply in its lower end and a joint connecting its upper end above the liquid, with the outlet, a liquid supply tank for the sight gauge having a valved connection between its bottom and the bottom of the sight gauge and a point above its liquid level with the inlet, and a connecting tube leading from the tank above its liquid level and opening into the sight gauge below its operating liquid level.

WALTER H. HENDRICKS.

REFERENCES CITED

The following references are of record in the file of this patent:

UNITED STATES PATENTS

| Number | Name | Date |
|---|---|---|
| 339,206 | Phelan | Apr. 6, 1886 |
| 1,706,567 | Dezendorf | Mar. 26, 1929 |
| 1,732,035 | White | Oct. 15, 1929 |
| 2,026,187 | Mennesson | Dec. 31, 1935 |
| 2,281,125 | Wiemer | Apr. 28, 1942 |

Certificate of Correction

Patent No. 2,493,967

January 10, 1950

WALTER H. HENDRICKS

It is hereby certified that errors appear in the printed specification of the above numbered patent requiring correction as follows:

Column 2, line 53, for "lowe" read *lower*; column 4, line 61, strike out the word "said" before "selective"; column 6, line 14, for "point" read *joint*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*